US011831698B2

(12) United States Patent
Ananthanarayanan et al.

(10) Patent No.: US 11,831,698 B2
(45) Date of Patent: Nov. 28, 2023

(54) DATA STREAMING PROTOCOLS IN EDGE COMPUTING

(71) Applicant: Microsoft Technology Licensing, LLC, Redmond, WA (US)

(72) Inventors: Ganesh Ananthanarayanan, Seattle, WA (US); Yu Yan, Bellevue, WA (US); Yuanchao Shu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 17/362,474

(22) Filed: Jun. 29, 2021

(65) Prior Publication Data

US 2022/0417306 A1    Dec. 29, 2022

(51) Int. Cl.
H04L 29/08     (2006.01)
H04L 65/75     (2022.01)
H04L 65/65     (2022.01)
G06N 5/04      (2023.01)
H04L 41/16     (2022.01)

(52) U.S. Cl.
CPC .............. H04L 65/75 (2022.05); G06N 5/04 (2013.01); H04L 41/16 (2013.01); H04L 65/65 (2022.05)

(58) Field of Classification Search
CPC .......... H04L 65/75; H04L 65/65; H04L 41/16
See application file for complete search history.

(56) References Cited

U.S. PATENT DOCUMENTS

| 2017/0372226 | A1* | 12/2017 | Costa ..................... G06F 21/60 |
| 2019/0327506 | A1  | 10/2019 | Zou et al. |
| 2021/0019893 | A1  | 1/2021  | Ananthanarayanan et al. |
| 2021/0103616 | A1  | 4/2021  | Agrawal et al. |
| 2021/0174155 | A1* | 6/2021  | Smith ................... G06F 18/211 |

OTHER PUBLICATIONS

Du, et al., "Server-Driven Video Streaming for Deep Learning Inference", in Proceedings of the Annual conference of the ACM Special Interest Group on Data Communication on the Applications, Technologies, Architectures, and Protocols for Computer Communication, Aug. 10, 2020, pp. 557-570.
"International Search Report and Written Opinion Issued in PCT Application No. PCT/US22/030146", dated Sep. 5, 2022, 12 Pages.
Wang, et al., "Enabling Edge-Cloud Video Analytics for Robotics Applications", in Proceedings of IEEE Conference on Computer Communications, May 10, 2021, 10 Pages.

* cited by examiner

Primary Examiner — Adnan M Mirza

(57) ABSTRACT

Systems and methods are provided for reducing stream data according to a data streaming protocol under a multi-access edge computing. In particular, an IoT device, such as a video image sensing device, may capture stream data and generate inference data by applying a machine-learning model trained to infer data based on the captured stream data. The inference data represents the captured stream data in a reduced data size based on performing data analytics on the captured data. The IoT device formats the inference data according to the data streaming protocol. In contrast to video data compression, the data streaming protocol includes instructions for transmitting the reduced volume of inference data through a data analytics pipeline.

20 Claims, 10 Drawing Sheets

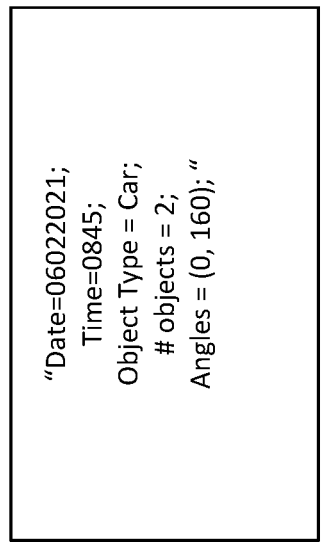
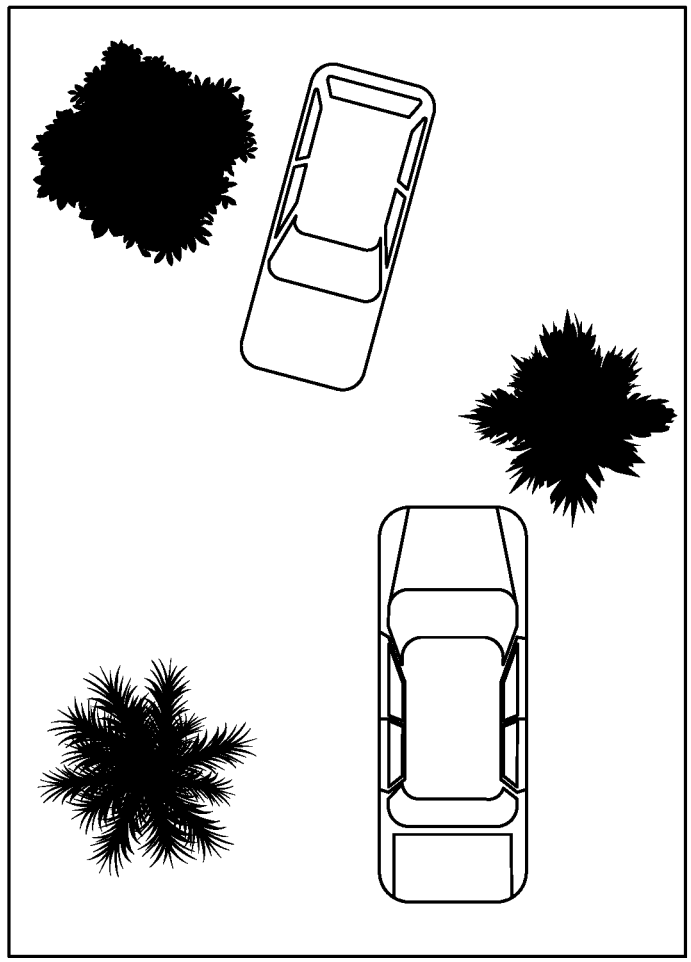
FIG. 3B
FIG. 3A

DATA STREAMING PROTOCOLS IN EDGE COMPUTING

With the advent of 5G, Multi-access Edge Computing (MEC) with data analytics pipelines has become important to improve performance of cloud services. In MEC, there is a hierarchy of devices and servers. For instance, Internet-of-Things (IoT) devices, e.g., cameras of personal or commercial security systems, municipal traffic cameras, and the like, capture and transmit stream data (e.g., video data) to cell towers. The cell towers relay the stream data to edge servers in on-premises (i.e., "on-prem") edges as uplink data traffic. The on-premises edge servers may generate inferences based on the stream data and transmit the inference data to network servers at network edges of a cloud infrastructure. The network servers may also generate inference data and transmit the data to cloud servers for further processing. In aspects, a combination of the IoT devices and the servers in the MEC hierarchy may form a data analytics pipeline. The data analytics pipeline may include a series of operations at various locations in the pipeline for analyzing data, recognizing objects in the data, and making decisions through various stages of generating inference data.

In the hierarchy of devices and servers within MEC, a bottleneck of data traffic may arise at various network segments. For example, a bottleneck may occur at a radio network segment between an IoT device and a cell tower. Another bottleneck may occur between the cell tower and an on-premises edge server located in proximity to the cell tower. Yet another bottleneck may occur between the on-premises edge server and the network edge server and/or the cloud server.

Techniques for efficiently transmitting data include compressing the data before transmission. Among various types of data that IoT devices capture and transmit through the data analytic pipeline, video stream data is volume-intensive. Thus, to efficiently transmit video stream data, video compression is commonplace. For example, an IoT device such as a video camera may compress captured video image data before transmitting the video stream data over the radio network to a cell tower, for instance. These video compression technologies often assume that a video player or other device ultimately decompress the compressed video stream data for viewing a video. In contrast, data analytics processes video stream data to recognize objects and otherwise evaluate the video stream data. For instance, data analytics include extracting regions of interest, recognizing objects, and generating inference data at varying levels of computational intensity.

Thus, while conventional video compression techniques have limited effectiveness for alleviating network bottlenecks, a need arises for compressing or otherwise reducing stream data used for data analytics. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to reducing a volume of stream data using a data streaming protocol in a data analytics pipeline under multi-access edge computing (MEC) systems. As noted above, the MEC involves a hierarchy of data centers and servers with a spectrum of varying levels of resource availability and geographic localities. When an on-premises edge server receives video stream data from an IoT device (e.g., from a video camera) over a radio access network (RAN), the on-premises edge server may perform video analytics, such as inference determinations, on the video stream data using a machine learning model.

The disclosed technology relates to techniques for reducing stream data in a data analytics pipeline. In addition to and/or as alternative to data compression of image data (e.g., video and/or image data compression at a pixel level), the disclosed technology includes a data streaming protocol for reducing a volume or amount of data for transmission, such as by identifying and transmitting regions of interest of video frames rather than the full pixelated frame and/or generating and transmitting inference data rather than raw video stream data. In this way, bandwidth is conserved by reducing an amount of data for transmission and processing resources are also conserved because less data is transmitted (e.g., regions of interest) for subsequent data analytics processing by the receiving server. Moreover, since the stream data is not compressed, decompression processing is also eliminated at the receiving server.

In aspects, the term "data analytics pipeline" may refer to a series of devices and servers for capturing and analyzing data. For instance, stream data (e.g., video stream data) may be captured by an IoT device (e.g., a video camera) and transmitted via a cell tower to a hierarchy of servers within a MEC system having varying resource constraints for processing the stream data. The term "on-premises edge" may refer to a datacenter at a remote location at the far-edge of a private cloud, which may be in proximity to one or more cell towers. The RAN, in combination with a core network of a cloud service provider, represents a backbone network for mobile wireless telecommunications. For example, cell towers may receive and transmit radio signals to communicate with IoT devices (e.g., video cameras) over a RAN (e.g., 5G). Various service applications may perform different functions, such as network monitoring or video streaming, and may be responsible for evaluating data associated with the data traffic. For instance, a service application may perform data analytics, such as object recognition (e.g., object counting, facial recognition, human recognition) on a video stream.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 3A-B illustrate examples of data in a data analytics pipeline in accordance with aspects of the present disclosure.

Figure 4:
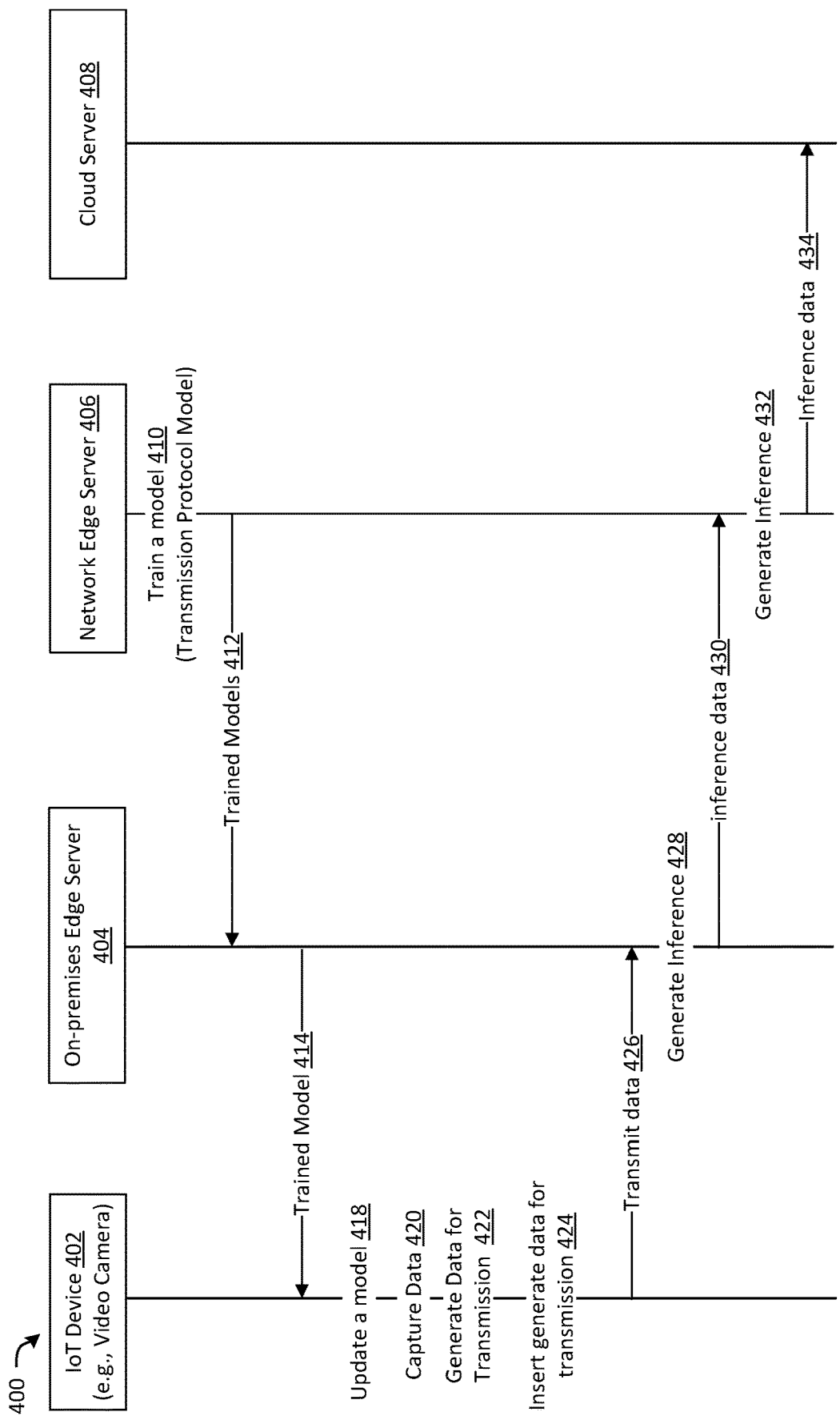

FIG. 4 illustrates an example of a method for reducing data using a data streaming protocol in a data analytics pipeline in accordance with aspects of the present disclosure.

Figure 5:
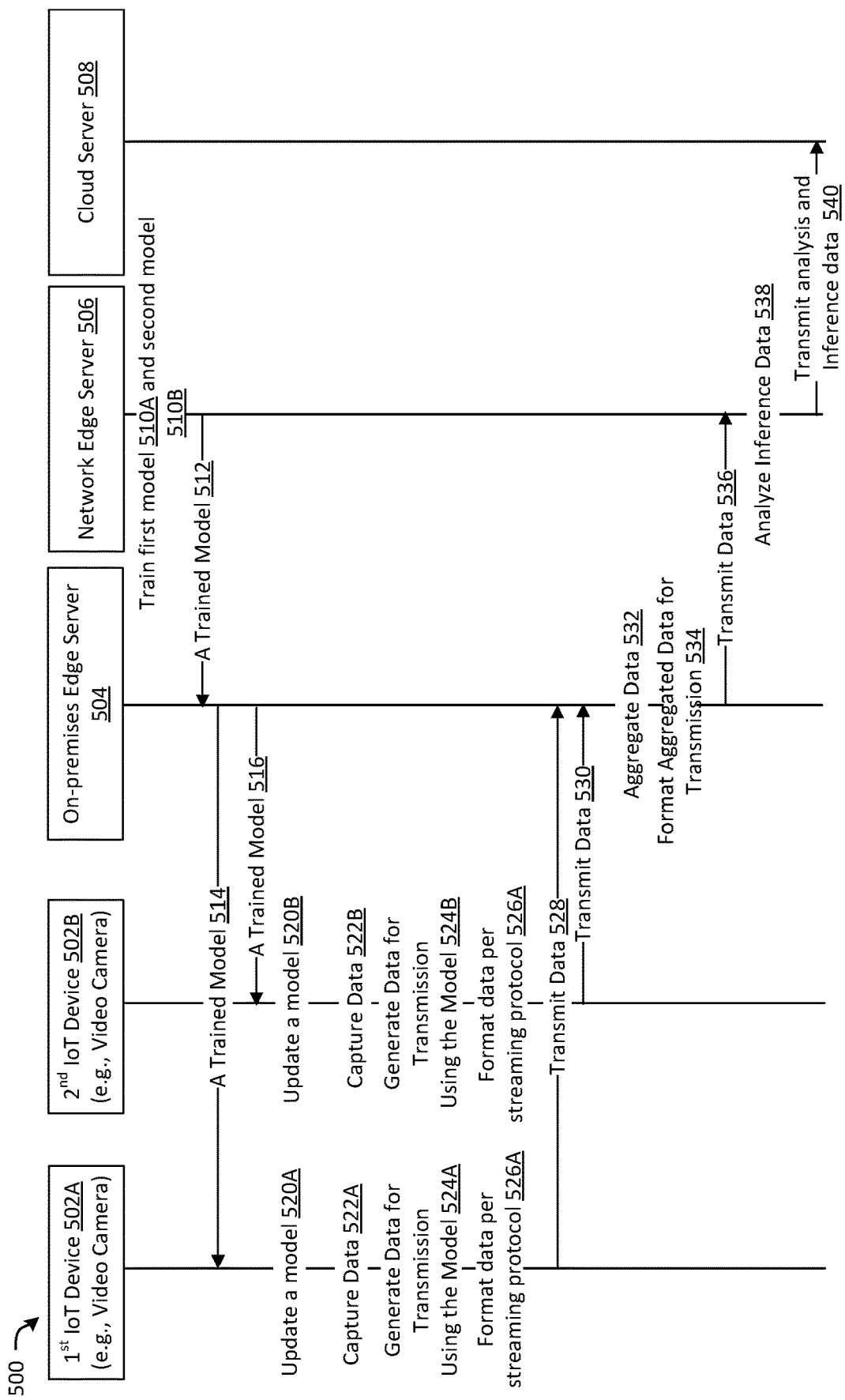

FIG. 5 illustrates an example of a method for reducing data using a data streaming protocol in a data analytics pipeline in accordance with aspects of the present disclosure.

Figure 6A:
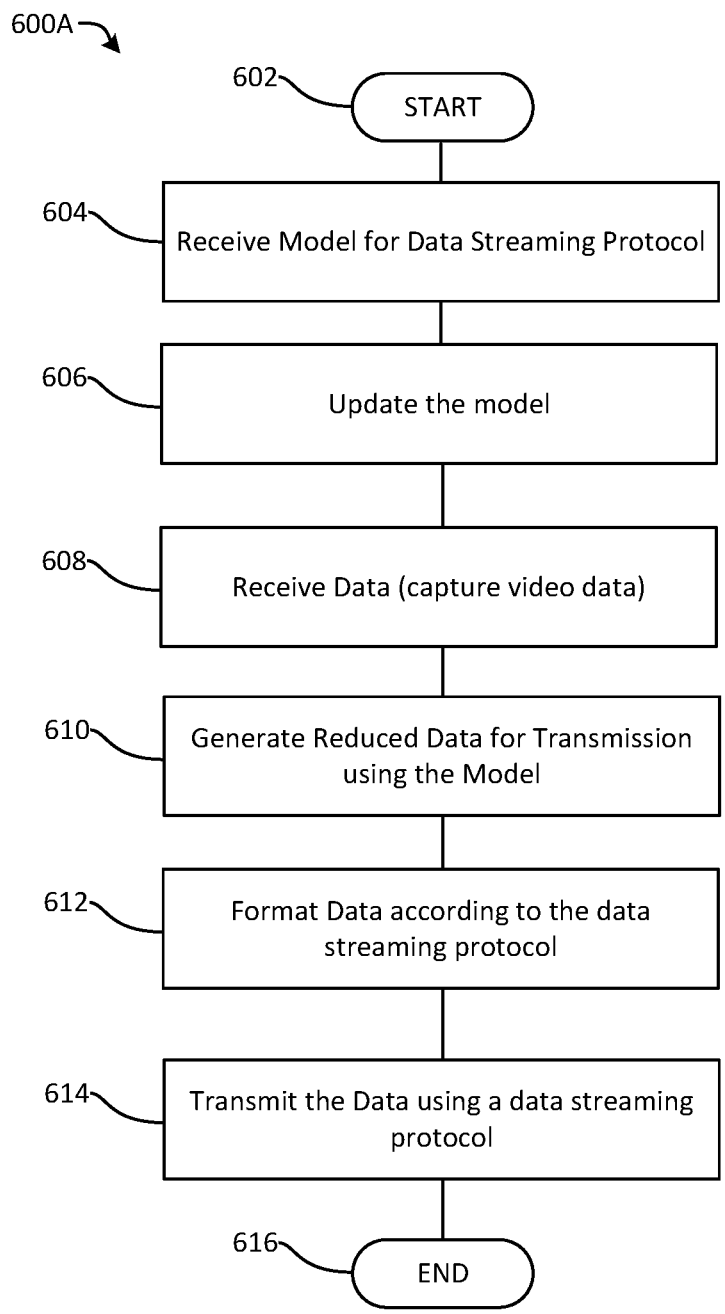
Figure 6B:
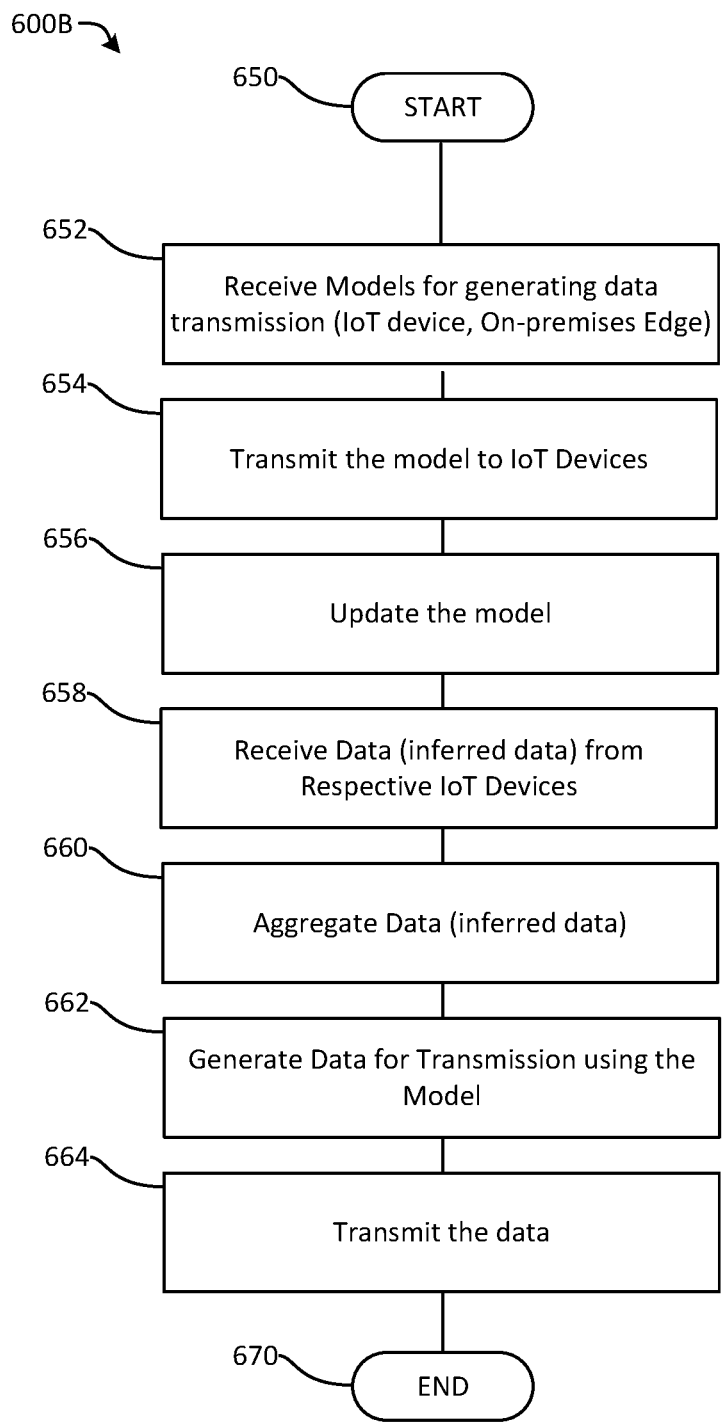

FIGS. 6A-B illustrate examples of a method for reducing data using a data streaming protocol in a data analytics pipeline in accordance with aspects of the present disclosure.

Figure 7:
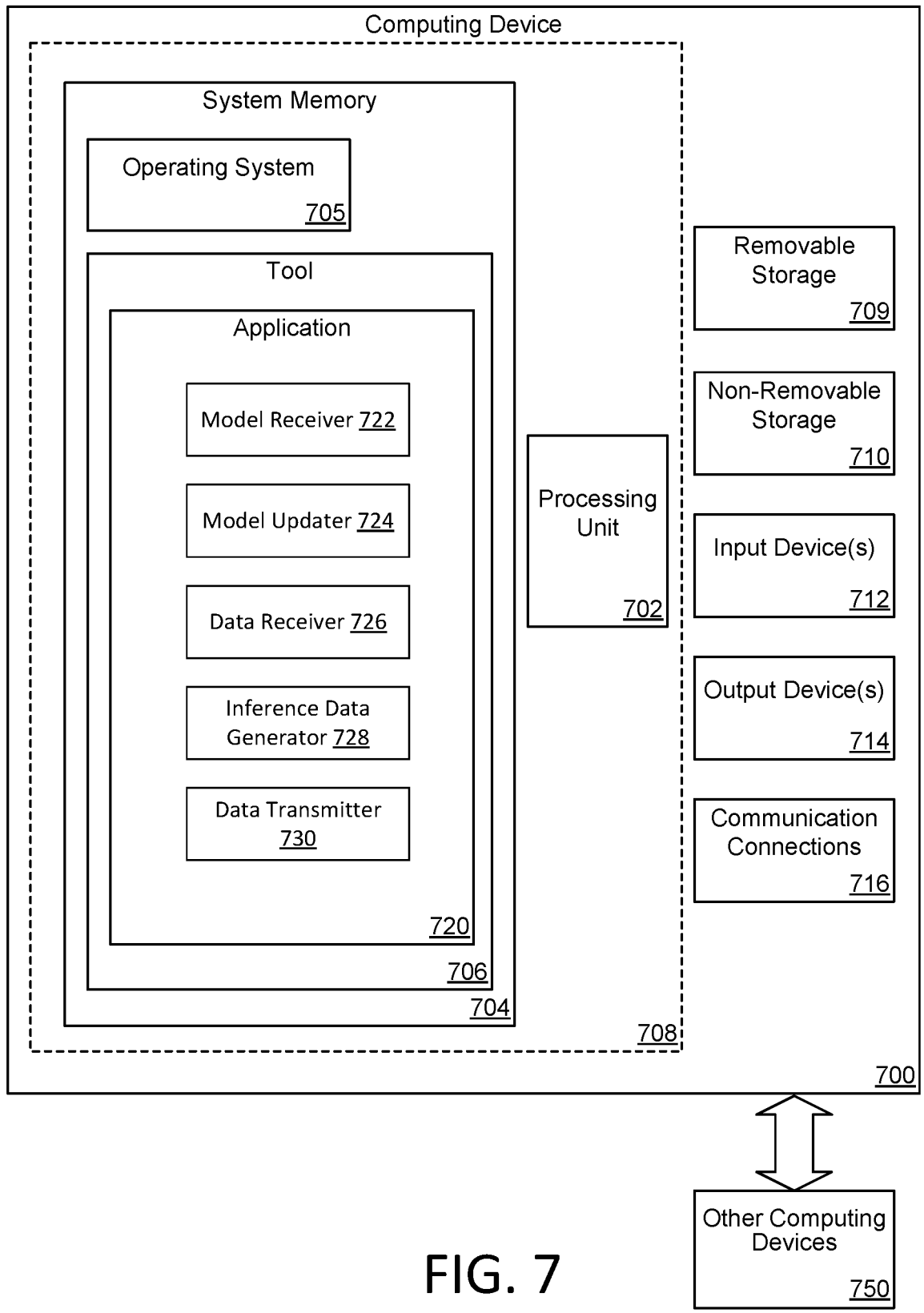

FIG. 7 is a block diagram illustrating example physical components of a computing device with which aspects of the disclosure may be practiced.

Figure 8A:
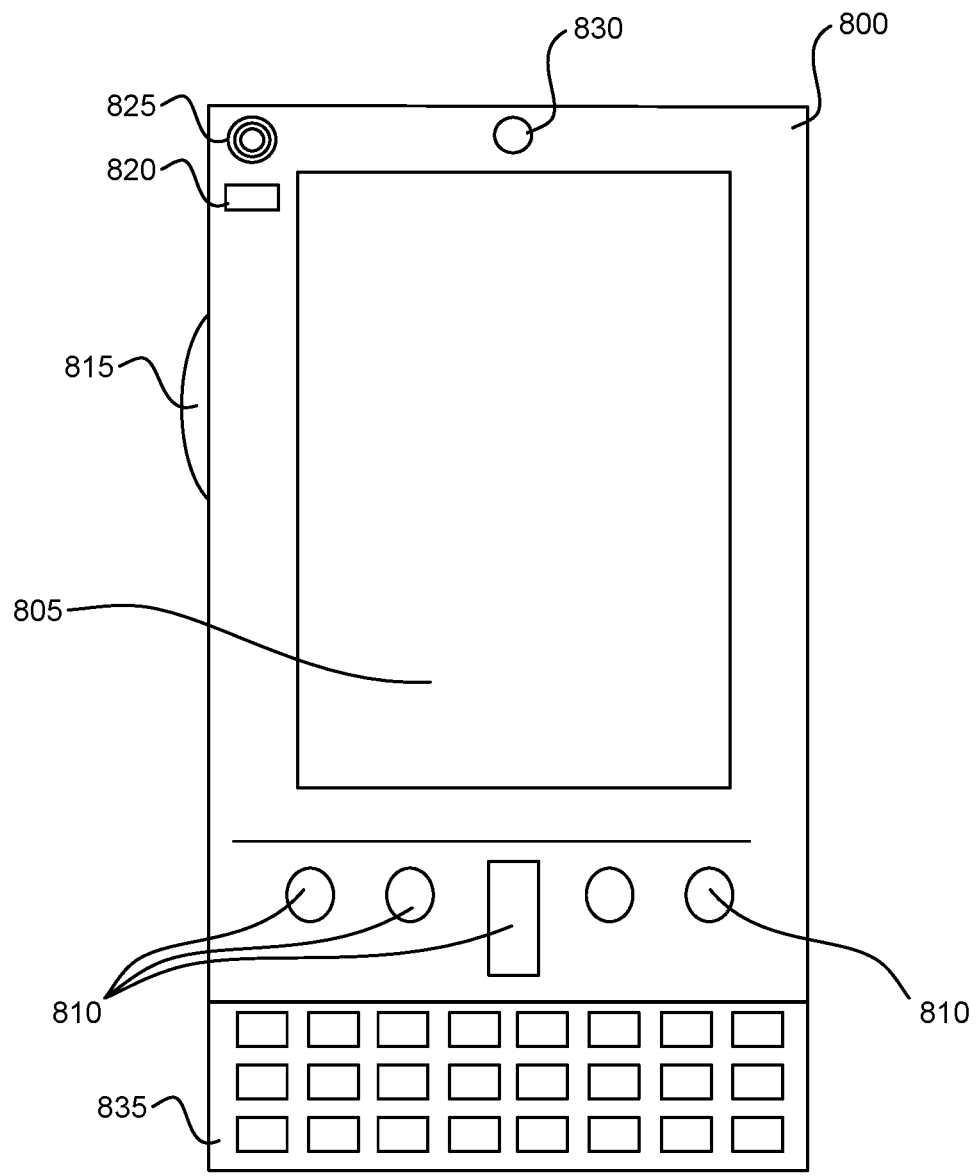

FIG. 8A is a simplified diagram of a mobile computing device with which aspects of the present disclosure may be practiced.

Figure 8B:
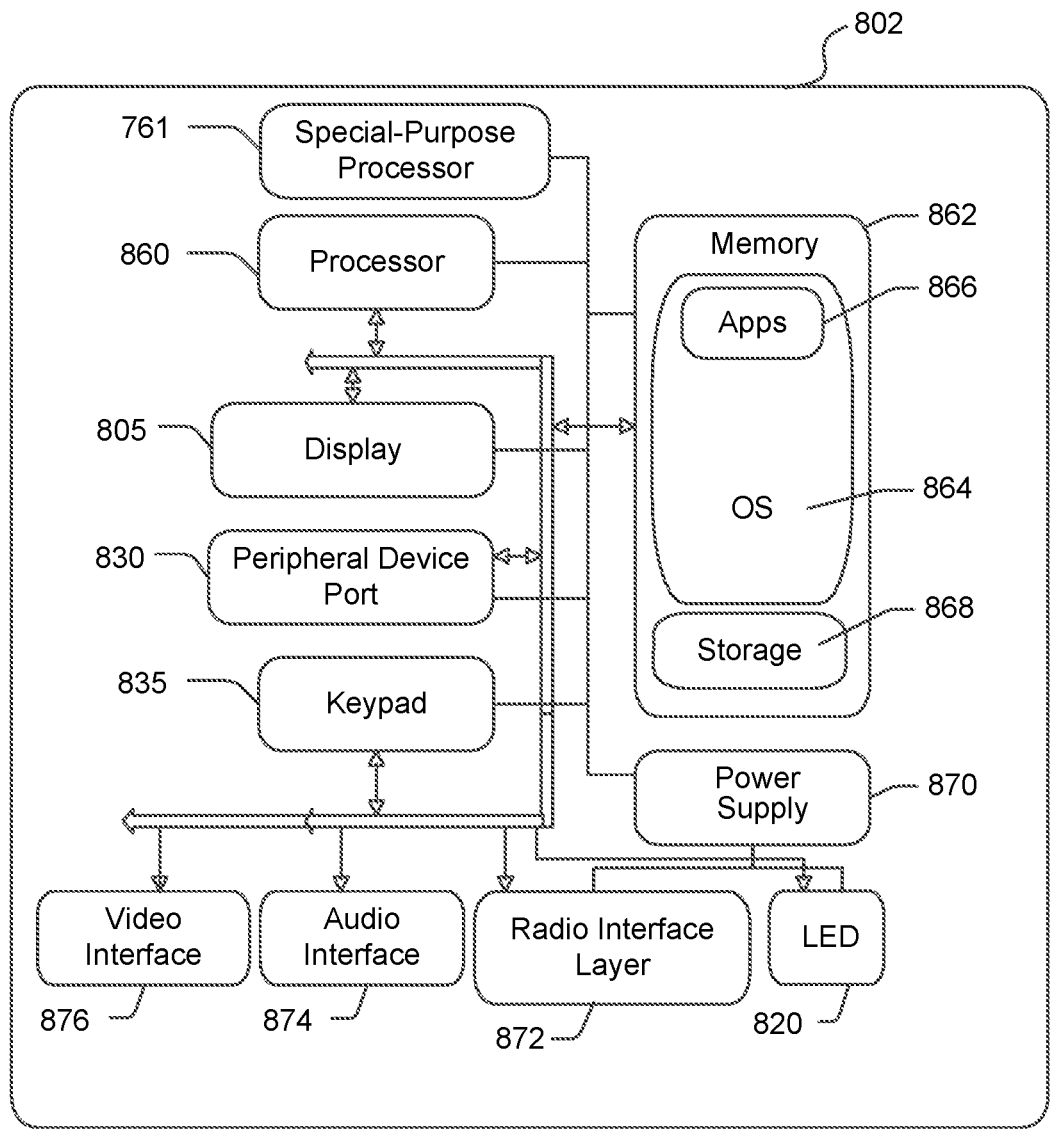

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Video recording systems may capture data in the form of videos and may deliver video stream data to players for viewing by users. Due to the sheer magnitude of the video stream data, these systems compress the data before transmission across networks. Traditional compression techniques compress video stream data for transmission with an ultimate goal of decompressing and restoring the video stream data for viewing by a human user.

In contrast, systems that perform data analytics on video stream data may analyze and determine features of the data without the video stream data ever being viewed by users. In this case, devices and servers in a data analytic pipeline may process the data in series or in parallel to generate inferences (e.g., object recognition) and execute actions based on the inferences. For example, a data analytics performed on video stream data may include recognizing regions of interest, recognizing types of objects (e.g., a face, an apple, an automobile, etc.), generating inference data based on the regions of interest and/or the object types (e.g., an identity of a person), and processing the inference data to determine an action (e.g., making a phone call to the person). Accordingly, early stages of the data analytics pipeline may include processing video frames, whereas later stages may not. While conventional video streaming protocols may provide limited network efficiency by compressing video stream data, there is a need for data streaming protocols to match data compression techniques to an intended use of the data, such as data analytics, rather than video viewing. In aspects, the data analytics pipeline includes a sequence of generating inference data based on data captured by IoT devices (e.g., sensing devices). The data analytics pipeline may span from the respective IoT devices to the cloud through cell towers, on-premises edge servers, and the network edge servers. The data analytics pipeline includes a sequence of devices and servers in ascending order of computing and memory resources available. Inference data may include description as inferred from content of data (e.g., a series of images or one or more video frames in video stream data) captured by one or more IoT devices or previously generated inference data.

The disclosed technology addresses the issue of network efficiency when transmitting stream data across a data analytics pipeline. In particular, the disclosed technology includes data streaming protocols that optimize use of data for analytics (e.g., video analytics) rather than for viewing quality. For example, the IoT device (e.g., a video camera and/or a video imaging device) may include filters for processing captured stream data. Techniques for processing the captured stream data may dynamically adapt to available network bandwidth in a segment between the IoT device and an on-premises edge server, for instance. In aspects, a data streaming protocol may include location information for tracking an object, dynamic adaptation for available network bandwidth, and extracting portions of the original stream data while maintaining accuracy of data analytics in the data analytics pipeline.

Figure 1:
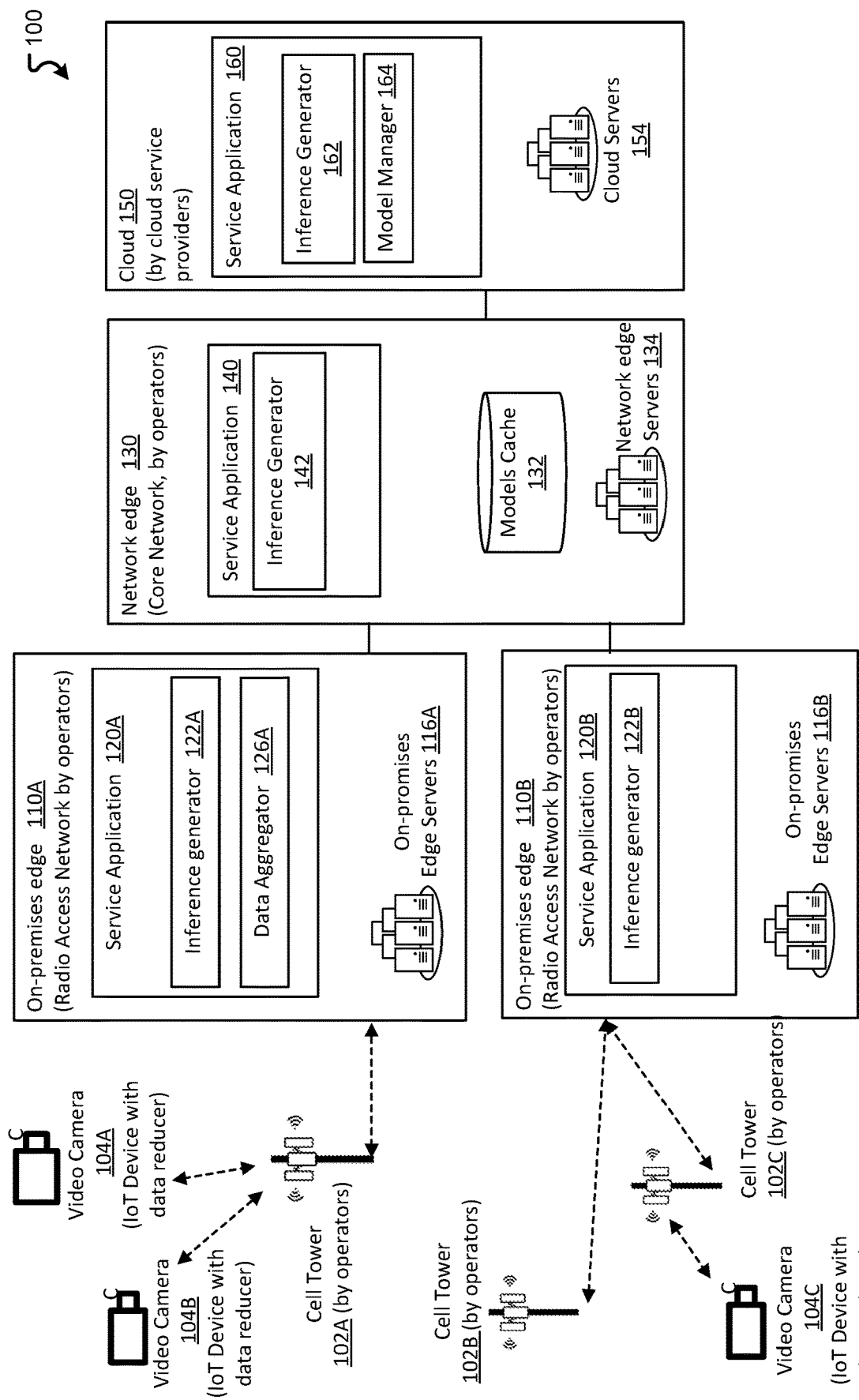
FIG. 1 illustrates an overview of an example system for reducing stream data based on a data streaming protocol in a data analytics pipeline across a MEC hierarchy in accordance with aspects of the present disclosure.

FIG. 1 illustrates an overview of an example system 100 for identifying techniques for reducing stream data transmitted across edge hierarchies under multi-access edge computing in accordance with the aspects of the present disclosure. Cell towers 102A-C transmit and receive wireless communications with IoT devices (e.g., video cameras, health monitors, watches, appliances, etc.) over a telecommunications network. Video cameras 104A-C represent examples of IoT devices communicating with the cell towers 102A-C in the field. In aspects, the video cameras 104A-C are capable of capturing video images, processing the video images to reduce data volume according to a data streaming protocol, and transmitting the reduced data over a wireless network (e.g., the 5G cellular wireless network) to one or more of the cell towers 102A-C. For example, respective video cameras 104A-C may capture scenes for video surveillance, such as traffic surveillance or security surveillance. The example system 100 further includes on-premises edges 110A-B (including edge servers 116A-B), a network edge 130 (including core network servers), and a cloud 150 (including cloud servers responsible for providing cloud services). In aspects, the example system 100 corresponds to a cloud RAN infrastructure for a mobile wireless telecommunication network.

In aspects, the video cameras 104A-C may filter captured video data. In some other aspects, the video cameras 104A-C may recognize objects in the captured video data using a model. The video cameras 104A-C may include an accelerator (e.g., a GPU) to process the captured video stream data. The video cameras 104A-C may identify regions of interest and track moving objects (e.g., cars) in captured video frames. The video cameras 104A-C may further determine types and numbers of objects identified in the video frames. In aspects, the data that describes types and numbers of objects may be in a textual format (e.g., a format using an eXtensible Markup Language). In some other aspects, the data may include one or more portions of a video image of the captured video frames. The one or more portions of the video image may correspond to regions of interest for further processing in the data analytic pipeline. Techniques for processing the video stream data may depend on computing and memory resources available in the respective video cameras 104A-C. The video cameras 104A-C may transmit the generated inference data as reduced stream data in a format of a data streaming protocol. The transmitted data may be processed further in the data analytics pipeline at on-premises edges 110A-B, the network edge 130 and/or the cloud 150.

As illustrated, the on-premises edges 110A-B are datacenters that are part of the cloud RAN. In aspects, the on-premises edges 110A-B enable cloud integration with a radio access network (RAN). The on-premises edges 110A-B include edge servers 116A-B, which process incoming data traffic and outgoing data traffic. The edge servers 116A-B may execute service applications 120A-B. In aspects, the on-premises edges 110A-B are generally geographically remote from the datacenters associated with the core network and cloud services. The remote site is in geographic proximity to respective cell towers. For example, the proximity may be within about a few kilometers. As illustrated, the on-premises edge 110A is in proximity to the cell tower 102A and the on-premises edge 110B is in proximity to the cell towers 102B-C. In aspects, the inference generator 122A and the inference generator 122B respectively generate inferences based on applying a machine learning model to data streams (e.g., video streams) captured by the IoT devices (e.g., video cameras 104A-C). In aspects, the inference generators 122A-B use pre-trained models to generate inferences. The inference generators 122A-B transmit the inference data to an upstream server (e.g., the servers 134 of the network edge 130).

In aspects, an on-premises edge 110A may aggregate data it receives from the video cameras 104A-B and generate inference data based on the aggregated data from the respective video cameras 104A-B for transmission to the network edge 130. For example, the video cameras 104A-B may capture video of a same location from different perspectives (e.g., a scene of a street from two opposite directions). The on-premises edge 110A may aggregate the two streams of data to generate inference data.

In further aspects, as datacenters become closer to the cloud 150, server resources (including processing units and memory) become more robust and powerful. As an example, servers 154 may be more powerful than servers 134, which may be more powerful than the edge servers 116A-B.

In aspects, the network edge 130 is at a regional datacenter of a private cloud service. For example, the regional datacenter may be about tens of kilometers from the cell towers 102A-C. The network edge 130 includes service application 140 that when executed performs data analytics. For example, the service application 140 includes video ML model or inference generator 142, which performs and manages video analytics using machine learning technologies, such as neural networks, to train analytics models. The network edge 130 may comprise memory resources that are more expansive than the memory resources available to the edge servers 116A-B of the on-premises edges 110A-B.

The cloud 150 (service) includes cloud servers for performing resource-intensive, non-real-time service operations. In aspects, one or more servers in the cloud 150 may be at a central location in a cloud RAN infrastructure. In this case, the central locations may be hundreds of kilometers from the cell towers 102A-C. In aspects, the cloud 150 includes service application 160 for performing data analytics. The service application 160 may perform similar processing tasks as a service application 140 in the network edge 130.

In aspects, the on-premises edges 110A-B, which are closer to the cell towers 102A-C and to the video cameras 104A-C (or IoT devices) than the cloud 150, may provide real-time processing. In contrast, the cloud 150, which is the furthest from the cell towers 102A-C and video cameras 104A-C in the cloud RAN infrastructure, may provide processing in a non-real-time manner.

The service applications 120A-B include program instructions for processing data according to predetermined data analytics scenarios on the edge servers 116A-B. The predetermined analytics may include, for example, inference generators 122A-B for generating inferences based on captured data. In aspects, the inference generators 122A-B perform video analytics and generate inference data by extracting and identifying objects from video stream data according to a trained model. For example, the inference generators 122A-B may rely on a plurality of trained models to identify different types of objects (e.g., trees, animals, people, automobiles, etc.), to generate a count of objects (e.g., a number of people in a video frame), and/or identify a particular object (e.g., a particular person based on facial recognition). In aspects, each model may be trained to identify a different type of object.

The incoming video stream may include background data and object data, which IoT devices (e.g., the video cameras 104A-C) captured and transmitted to the cell towers 102A-C. For example, the service applications 120A-B may analyze the video stream and extract portions of the video stream as regions of interest, which regions of interest may comprise object data as opposed to background data. Once extracted, the regions of interest may be evaluated to recognize objects (e.g., a face of a person), as described above, or the service applications 120A-B may transmit the extracted regions of interest (rather than the full video stream) to the cloud for further processing (e.g., to identify a person by performing facial recognition on the face of the person). In aspects, the edge servers 116 includes computing and memory resources that are limited while the servers 134 at the network edge 130 include resources that are sufficiently robust to perform facial recognition on the video stream to identify a name of a person.

In contrast to the on-premises edges 110A-B, network edge 130 has more computational and memory resources to perform video analytics that are more resource intensive and/or complex. Thus, the service application 140 executing at the network edge 130 may both generate inference data and manage models for respective on-premises edges 110A-B. In aspects, the network edge 130 include a model cache 132. The model cache 132 is storage memory that stores generated and trained models for updating models utilized at the respective on-premises edges 110A-B.

In aspects, the disclosed technology dynamically moves various operations (e.g., data reducers, inference generators and data aggregators) among the IoT devices and the servers in the hierarchy. For example, the model manager 164 in the cloud 150 may receive information associated with availability of computing resources in various devices and servers in the example system 100. Based on the availability, the model manager 164 may dynamically allocate and move various operations to respective devices and servers as appropriate to facilitate the overall operations of the data analytics pipeline.

In aspects, there may be two or more layers in the hierarchical structure. For example, a hierarchical structure with two layers may include on-premises edges in a first layer and a combination of the network edge server and the cloud in a second layer. A hierarchical structure with three layers may include on-premises edges in a first layer, network edges in a second layer, and the cloud in a third layer. In some aspects, the hierarchical structure may include any number of layers, including devices, on-premises edges, network edges, the cloud, or the like.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
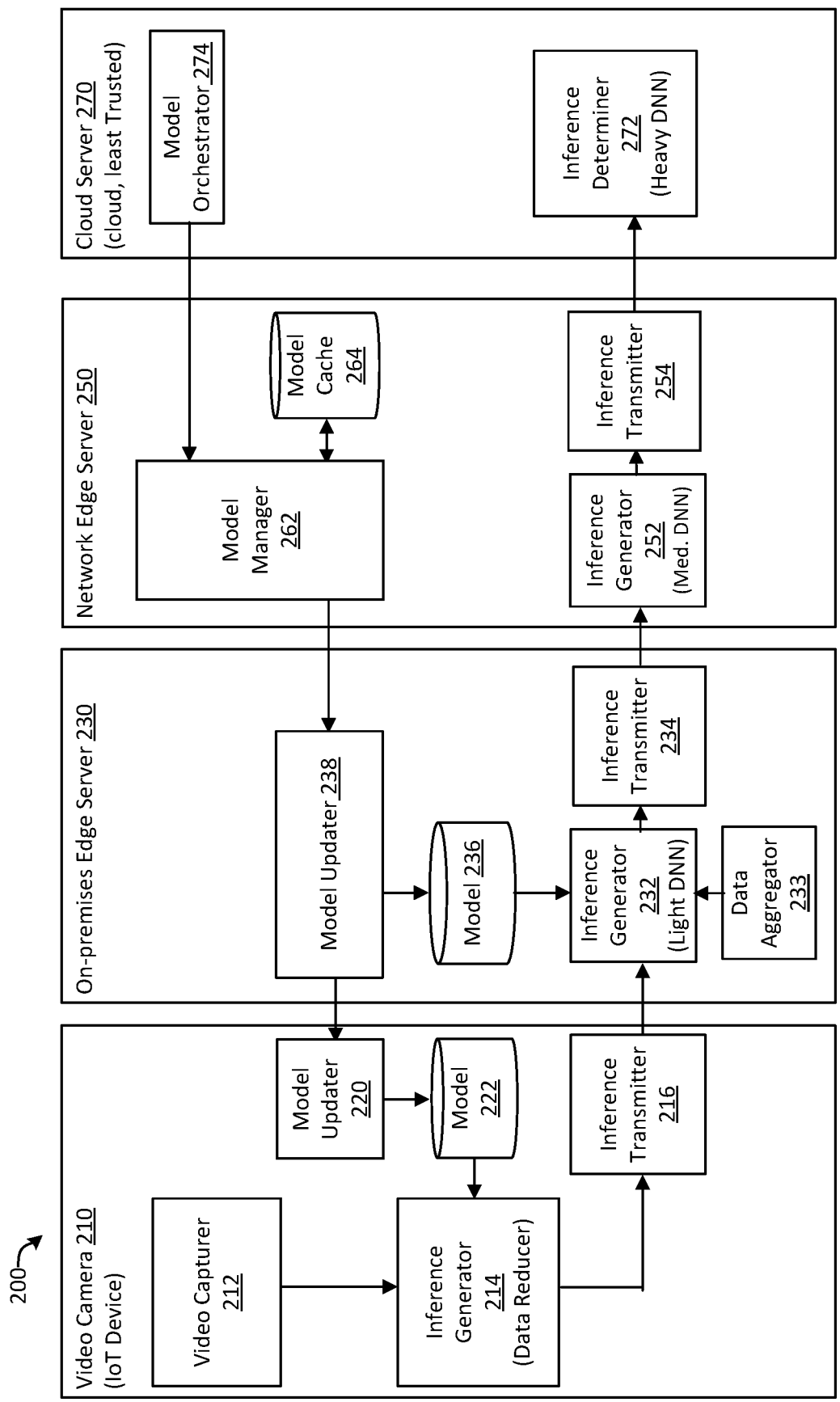
FIG. 2 illustrates an example system for processing data based on data streaming protocol in a data analytics pipeline across a MEC hierarchy in accordance with aspects of the present disclosure.

FIG. 2 illustrates an example system for identifying techniques for reducing stream data across edge hierarchies in accordance with aspects of the present disclosure. The system 200 includes video camera 210 (IoT device), on-premises edge server 230, network edge server 250, and cloud server 270. In aspects, the video camera 210 (e.g., the video camera 104A as shown in FIG. 1) captures images and transmits video stream data to the on-premises edge server 230 via a cell tower (e.g., the cell tower 102A as shown in FIG. 1).

The video camera 210 includes video capturer 212, inference generator 214, and inference transmitter 216, model updater 220, and a model 222. In aspects, the video capturer 212 captures video scenes in video stream data. The video stream data may include video frames, each video frame including a video image. Examples of the video scenes may include a video surveillance of a street and/or hallway with one or more objects (e.g., people, automobiles, animals, and the like) may appear at times. The inference generator 214 (a data reducer) uses the model 222 to generate inference data based on the captured video scenes. In aspects, the inference data has a data volume or size that is less than a size of the captured video stream data and a size of compressed video stream data using a traditional video compression technology. For example, the inference data may include a text string that describes the video (e.g., two cars at a date 2021-06-01 at 0845). In aspects, a size of the inference data is reduced as compared to the captured video stream data. The inference data is a reduced representation of the captured video data based on a protocol for data streaming from the video camera 210 and the on-premises edge server 230. The inference transmitter 216 transmits the inference data to inference generator 232 (Light Deep Neural Network (DNN)) in the on-premises edge server 230. The model updater 220 receives and updates a model 222 in the video camera 210. In aspects, the model updater 220 receives the model 222 from a model updater 238 in the on-premises edge server 230.

The on-premises edge server 230 includes inference generator 232, the inference data transmitter 234, model 236, and model updater 238. The inference generator 232 (light DNN) in the on-premises edge server 230 receives the reduced representation of the captured video stream data from the video camera 210 through the cell tower. In aspects, the inference generator 232 determines inferences based on the video stream data using a model 236. In aspects, the model is a trained model for generating inference data with accuracy based on a given condition where the video camera 210 captures scenes in the video. The on-premises edge server 230 provides more computing and memory resources than the video camera 210 does, but less than the network edge server 250. Accordingly, the inference generator 232 may use a model 236 (e.g., a light version of a deep neural network) to perform inference operations less complex than the network edge server 250. In aspects, a size of the inference data generated by the inference generator 232 is a further reduced representation of the data received from the video camera 210 based on a protocol for data streaming from the on-premises edge server 230 and subsequent servers (e.g., the network edge server 250) in the data analytics pipeline. Data aggregator 233 aggregates inference data received from multiple IoT devices.

The inference data transmitter 234 in the on-premises edge server 230 formats and transmits the determined inference data to the network edge server 250 using the data streaming protocol. In particular, the inference data transmitter 234 transmits the inference data to a data drift determiner 256 and an inference determiner 252 (using a medium deep neural network) in the network edge server 250.

The model updater 238 receives the new or fine-tuned model from the network edge server 250 and updates the model 236. In aspects, the model updater 238 receives a newly trained model for replacing or updating the model 236 on a periodic basis. For example, one model may be for recognizing objects in image data captured under daylight; another model may be for recognizing objects in image data captured in dark.

The network edge server 250 includes the inference determiner 252 (medium deep neural network), an inference data transmitter 254, a model manager 262, and a model cache 264. A combination of the inference determiner 252 and the inference data transmitter 254 is a part of the data analytics pipeline for generating inferences for captured video stream data. A combination of the model manager 262 with the model cache 264 enables updating of models used by the on-premises edge server 230 and the video camera 210.

The inference determiner 252 at the network edge server 250 generates inference data based on the video stream data from the on-premises edge server 230. In aspects, the network edge server 250 may include a combination of locally-installed servers for meeting near real-time processing requirements and cloud-based, virtual servers with more resources than the locally-installed servers. Accordingly, the inference determiner 252 may utilize a medium level deep neural network and may be capable of performing more complex video analytics than the inference generator 232. In aspects, the data that the inference determiner 252 generates is yet a further reduced representation of the captured video data based on the data streaming protocol in the data analytics pipeline.

In aspects, the model manager 262 may manage one or more models that have been previously generated and stored in model cache 264. The model manager 262 queries models stored in the model cache 264 to determine models to update. If the model manager 262 finds a model for suitable for replacing model 236, the model manager 262 retrieves the replacement model from the model cache 264 and transmits the replacement model to a model updater 238 at the on-premises edge server 230.

In aspects, the model manager 262 may receive the trained model and store the trained model in the model cache 264. In other aspects, the model manager 262 may refresh the model cache 264 periodically based on an age of stored models in the model cache 264 and/or a memory capacity of the model cache 264. The model manager 262 transmits the trained model to the model updater 238 at the on-premises edge server 230. In aspects, the model manager 262 may transmit the trained model to one or more other on-premises edge servers to maintain consistency of the models across the on-premises edge servers.

Additionally or alternatively, the model manager 262 from a higher layer (e.g., the network edge server 250) of the hierarchy of servers in MEC may dynamically update operations for reducing data in devices and servers in lower layers of the hierarchy. The dynamic updates maintain processing integrity within the data analytic pipeline. For example, the model manager 262 may change regions of interests for analyzing a portion of a captured image. Accordingly, the inference generator 214 (data reducer) in the video camera 210 may update region(s) for masking the captured video frame to reduce data size for transmission.

In aspects, the cloud server 270 provides the most abundant resources as compared to the resources in the video camera 210, the on-premises edge server 230, and the network edge server 250. Accordingly, the inference determiner 272 uses a heavy (e.g., a large scale) deep neural network to generate inferences from the video stream data. The cloud server 270 includes a model orchestrator 274. The model orchestrator 274 maintains consistency of the models used for data analytics in MEC. The model orchestrator 274 transmits instructions to servers at various levels of the MEC hierarchy involved in the data analytics (e.g., video analytics) pipeline (e.g., the pipeline associated with analyzing video stream data from capture at the video camera 210 to complex processing at the cloud server 270).

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

FIGS. 3A-B illustrate examples of images associated with generating inference data in accordance with the aspects of the present disclosure. FIG. 3A illustrates an example of a captured video frame 300. In aspects, the video frame 300 is associated with video stream data as captured by a video camera (e.g., the video camera 210 as shown in FIG. 2). For example, the video frame depicts a full-size car, a compact car, and three trees. In aspects, the video camera transmits the image to an on-premises edge server (e.g., the on-premises edge server 230 as shown in FIG. 2).

FIG. 3B illustrates an example of inference data. In aspects, the inference includes identifying and extracting one or more regions of interest for the data analytics. An example 300B indicates: "Date=06022021; Time=0845; Object Type=Car; #objects=2; Angles=(0, 160)." In this case, rather than compressing and transmitting video stream data, the system makes inference determinations on the video stream data and then merely transmits the semantic or textual results of the inference determinations based on a data streaming protocol. In this way, rather than compressing and transmitting substantially all of the video stream data for viewing, the system can transmit textual data which utilizes significantly less bandwidth in a data analytics pipeline. The disclosed technology includes a model used for the inference determination and the system generates and updates the model to reflect types of inferences performed in a hierarchy of servers in the data analytics pipeline.

FIG. 4 illustrates an example method for reducing stream data using a data streaming protocol in accordance with aspects of the present disclosure. Hereinafter, the method 500 shall be explained with reference to the systems, components, devices, modules, software, data structures, data characteristic representations, signaling diagrams, methods, etc., described in conjunction with FIGS. 1, 2, 3A-C, 5, 6A-B, 7, and 8A-B.

The method 400 includes IoT device 402 (e.g., video camera), on-premises edge server 404, network edge server 406, and cloud server 408. The network edge server 406 generates a trained model 410. The model specifies generating inference data to be used a part of a data streaming protocol for transmitting data from the IoT device 402 to the on-premises edge server 404. The network edge server 406 transmits (412) the trained models. The on-premises edge server 404 receives and then transmits (414) the trained model to the IoT device 402. The IoT device 402 updates (418) the model. After the IoT device 402 captures (420) data (e.g., video data), the IoT device 402 uses the trained model to generate (422) data for transmission. For example, the IoT device 402 may use the trained model to recognize automobiles in a video frame regions of interest and generate text-based data that indicate a number of automobiles in the video frame. The IoT device 402 inserts (424) the generated data as a part of stream data protocol and transmits (426) the data to the on-premises edge server 404.

The on-premises edge server 404 generates (428) inference data based on the received data. The on-premises edge server transmits (432) the inference data to the network edge server 406. The network edge server 406 further generates inference data based on the received inference data and transmits (434) the inference data to the cloud server 408.

FIG. 5 illustrates an example method for reducing stream data in accordance with aspects of the present disclosure. Hereinafter, the method 500 shall be explained with reference to the systems, components, devices, modules, software, data structures, data characteristic representations, signaling diagrams, methods, etc., described in conjunction with FIGS. 1, 2, 3A-C, 4, 6A-B, 7, and 8A-B.

The method 500 includes first IoT device 502A and second IoT device 502B (e.g., video cameras), on-premises edge server 504, network edge server 506, and cloud server 508. In aspects, the first IoT device 502A and the second IoT device 502B are tasked with capturing videos of a street from different directions or angles and identifying regions in video frames where one or more cars appear. For example, the first IoT device 502A monitors the intersection from the north side while the second IoT device 502B monitors the same intersection from the south side. Using a data analytics pipeline, an application service determines when a predetermined car passes through the intersection. The network edge server 506 generates a trained first model 510A for first IoT device 502A and a trained second model 510B for second IoT device 502B. The first model 510A and the second model 501B are trained to recognize regions of interest (e.g., an intersection or view of a road) in a video frame, where at least one car may appear. In aspects, the trained first model 510A and the trained second model 510B are identical models. In some other aspects, the trained first model 510A and the trained second model 510B may be distinct when the two camera views have distinct features (e.g., light saturation and/or known objects obstructing view in respective scenes). In the illustrated example, the two models may be substantially the same. The network edge server 506 transmits (512) the trained first model 510A and the trained second model 510B to the on-premises edge server 504, which then transmits (514) the trained first model 510A to the first IoT device 502A and transmits (516) the trained second model 510B to the second IoT device 502B. The first IoT device 502A updates (520A) a model store with the trained first model 510A and the second IoT device 502B updates (520B) a model store with the trained second model 510B.

After the first IoT device 502A captures (522A) data (e.g., a video frame depicting the traffic intersection), the first IoT device 502A uses the trained first model 510A to generate (524A) first inference data that include one or more regions of interest associated with portions of a video frame including recognized objects such as car(s). For example, the first IoT device 502A may use the trained first model 510A to generate data for transmission by identifying and extracting regions of interest in the captured video frame of the traffic intersection. The first IoT device 502A formats (526A) the regions of interest in the video frame based on a data streaming protocol and transmits (528) the first inference data to the on-premises edge server 504. In this way, rather than compressing and transmitting video stream data associated with captured video frames of the traffic intersection, the first IoT device 502A merely sends regions of interest according to a data streaming protocol, which substantially decreases the bandwidth needed for data transmission.

After the second IoT device 502B captures (522B) data (e.g., a video frame depicting a street intersection), the second IoT device 502B uses the trained second model 510B to identify and generate (524B) regions of interest where one or more cars appear in the captured video frame. For example, the second IoT device 502B may use the trained second model 510B to extract regions of interest in the captured video frame of the intersection. The second IoT device 502B formats (526B) the generated second inference data based on a data streaming protocol and transmits (528) the second inference data (i.e., extracted regions of interest) to the on-premises edge server 504. In this way, rather than compressing and transmitting video stream data associated with captured video frames of the street intersection, the second IoT device 502B merely sends the second inference data, which substantially decreases the bandwidth needed for data transmission.

The on-premises edge server 504 aggregates (532) the first inference data received from the first IoT device 502A and the second inference data received from the second IoT device 502B by confirming a number of cars passed through the intersection from both camera views (e.g., the north side and the south side). The on-premises edge server 504 then formats (534) the aggregated first and second inference data based on the data streaming protocol. In aspects, the aggregated data includes textual description of a number of cars (e.g., "#cars=2"). The on-premises edge server transmits (536) the aggregated first and second inference data to the network edge server 506. The network edge server 506 further analyzes (538) the aggregated first and second inference data and transmits (540) the analysis and the aggregated first and second inference data to the cloud server 808, for instance.

FIG. 6A is an example of a method for training models using a model cache in accordance with aspects of the present disclosure. A general order of the operations for the method 600A is shown in FIG. 6A. Generally, the method 600A begins with start operation 602 and ends with end operation 616. The method 600 may include more or fewer steps or may arrange the order of the steps differently than those shown in FIG. 6A. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600A shall be explained with reference to the systems, components, devices, modules, software, data structures, data characteristic representations, signaling diagrams, methods, etc., described in conjunction with FIGS. 1, 2, 3A-C, 4, 5, 6B, 7, and 8A-B.

Following start operation 602, the method 600 begins with receive operation 604, which receives a model for inference generation and a data streaming protocol. In aspects, an IoT device (e.g., a video camera) performs the method 600A. The model and the data streaming protocol include one or more techniques for generating and transmitting inference data based on video stream data. For example, techniques include recognizing a predefined set of object types (e.g., automobiles) in a video frame, identifying portions of the image comprising the recognized objects as regions of interest, counting a number of objects in the regions of interest, and generating textual data that describes the number of objects. In aspects, the model being used in the IoT device requires a smaller memory footprint and/or lighter processing load than models used by on-premises edge servers. In aspects, the receive operation 604 includes a retrieve operation to retrieve the model stored in the IoT device when there is not a new model in a model cache. In aspects, the model includes instructions to dynamically adapt techniques for generating data according to the data streaming protocol. For example, the model instructs extracting and transmitting regions of interest from video images of a video frame when a network utilization for a network segment between the IoT device and the on-premises edge server is less than a threshold and, thus, the network segment is not a bottleneck. In contrast, the model may instruct generating a textual description of the regions of interest when there is a bottleneck at the network segment.

Update operation 606 updates the model in the IoT device. The IoT device uses the model to process video stream data that the IoT device captures. Receive operation 608 receives video stream data. In aspects, the receive operation 608 includes capturing video data.

Generate operation 610 generates reduced data for transmission using the model. In aspects, the generate operation 610 generates regions of interest from a video frame. In some other aspects, the generate operation 610 generates, when the IoT device has sufficient computing resources, textual data that describes a number of automobiles appearing in a video frame as inference data based on the captured video stream. In aspects, the generate operation uses a model to generate inference data.

Format operation 612 formats the data according to a data streaming protocol. In aspects, the format operation 612 formats the inference data for transmission. In aspects, the inference data is less in size than compressed video data.

Transmit operation 614 transmits the data to the on-premises edge server. The method 600 ends with the end operation 616. As should be appreciated, operations 602-616 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6B is an example of a method for transmitting data using a data streaming protocol in accordance with aspects of the present disclosure. A general order of the operations for the method 600B is shown in FIG. 6B. Generally, the method 600B begins with start operation 650 and ends with end operation 670. The method 600B may include more or fewer steps or may arrange the order of the steps differently than those shown in FIG. 6B. The method 600 can be executed as a set of computer-executable instructions executed by a computer system and encoded or stored on a computer readable medium. Further, the method 600B can be performed by gates or circuits associated with a processor, an ASIC, an FPGA, a SOC or other hardware device. Hereinafter, the method 600B shall be explained with reference to the systems, components, devices, modules, software, data structures, data characteristic representations, signaling diagrams, methods, etc., described in conjunction with FIGS. 1, 2, 3A-C, 4, 5, 6A, 7, and 8A-B.

Following start operation 650, the method 600B begins with receive operation 652, which receives models and a data streaming protocol. In aspects, an on-premises edge server performs the method 600B. The model and data streaming protocol include one or more techniques for generating inference data from video stream data. For example, techniques include recognizing a predefined set of object types (e.g., automobiles) in a video frame, identifying portions of the image comprising the recognized objects as regions of interest, counting a number of objects in the regions of interest, and generating textual data that describes the number of objects. In aspects, the model being used at the on-premises edge server requires a larger memory footprint and/or heavier processing load than models used by the IoT devices. In aspects, the receive operation 652 includes a retrieve operation to retrieve the model stored in the on-premises edge server when there is not a new model in a model cache. In aspects, the model includes instructions to dynamically adapt techniques for generating data according to the data streaming protocol. For example, the model may be trained to receive two inputs, each received from respective IoT devices. For example, the trained model may take two textual descriptions or textual representations (e.g., first and second inference data) of scenes received from IoT devices.

Transmit operation 654 transmits the model to IoT devices. In aspects, the on-premises edge server may connect to more than one IoT Devices. For example, the more than one video cameras may be co-located and capture video of a street scene from different angles.

Update operation 656 updates the model in the on-premises edge server. The on-premises edge server may use the updated model to process data received from the IoT device. Receive operation 658 receives data from the IoT device. For example, the received data may be a textual description or a textual representation of a scene that has been captured by the IoT device.

Aggregate operation 660 aggregates the received data from respective IoT devices. In aspects, the received data includes regions of interest data. In some other examples, the aggregate operation 660 may aggregate data "a number of automobile=1 at scene A" received from an IoT device and data "a number of automobile=1 at scene A" received from another IoT device.

Generate operation 662 generates data for transmission based on the model. In aspects, the generate operation 662 generates textual data that describes a number of automobiles appearing in a video frame as inference data based on the captured video stream. For example, the generate operation 662 generate a text data ""a number of automobile=1 at scenes A and B." The consolidation of the data may effectively reduce a volume of data transmission between the on-premises edge server and the network edge server when a network bottleneck appears in at a network segment between the on-premises edge servers and the network edge server.

Transmit operation 664 transmits the data to the network edge server. The method 600 ends with the end operation 670. As should be appreciated, operations 650-670 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a model receiver 722, a model updater 724, a data receiver 726, an inference data generator 728, and a Data transmitter 730 as described in more detail with regard to FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instruction, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of servers in the on-premises edge in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the on-premises edge servers 116A-B, the network edge servers 134, and other servers as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to reducing stream data for performing data analytics in a data analytics pipeline, the data analytics pipeline including processing of the stream data from a plurality of sensing devices to servers of a cloud network environment based on multi-access edge computing according to at least the examples provided in the sections below. The method comprises retrieving, by a sensing device, the trained model, wherein the trained model includes instructions for processing content of a series of images to generate inference data for data analytics in the data analytics pipeline; capturing stream data, wherein the captured stream data includes the series of images; generating, based on at least one image of the captured stream data, inference data using the trained model, wherein the inference data includes a description as inferred from the content of the at least one image based on the trained model; formatting the inference data according to a data streaming protocol used for data transmission in the data analytics pipeline; and transmitting the formatted inference data rather than the captured stream data to a server in the data analytics pipeline using the data streaming protocol. The series of images includes a video frame, and wherein the inference data includes a textual representation of the data analytics performed on the captured stream data. The trained model includes instructions for determining a textual description of the series of images, wherein a data size of the textual description is less than a data size of the series of images. The trained model includes instructions for identifying one or more portions of the series of images, wherein a data size of the one or more identified portions of the series of images is less than a data size of the series of images. The method further comprises receiving, by an IoT device, the trained model from an on-premises server; and transmitting the formatted inference data to the on-premises server. The IoT device is a video imaging device, wherein the server is an on-premises edge server in a hierarchy of servers of the data analytics pipeline. The data analytics pipeline includes a network bottleneck between the IoT device and the on-premises edge server over a wireless network. The method further comprises causing the server to receive other inference data from a second IoT device; aggregating the inference data and the other inference data; and formatting the aggregated inference data for transmission to a second server, wherein the second server is one of a network server or a cloud server, and wherein the data analytics pipeline includes a network bottleneck between the on-premises edge server and one of the network edge server or the cloud server.

Another aspect of the technology relates to a system for reducing stream data for performing data analytics in a data analytics pipeline, the data analytics pipeline including processing of the stream data from a plurality of sensing devices to servers of a cloud network environment based on multi-access edge computing. The system comprises a processor; and a memory storing computer-executable instructions that when executed by the processor cause the system to: retrieve, by a first server, the trained model, wherein the trained model includes instructions for processing content of a series of images to generate inference data for data analytics in the data analytics pipeline; receive captured stream data, wherein the captured stream data includes the series of images; generate, based on at least one image of the captured stream data, the inference data using the trained model, wherein the inference data includes a description as inferred from the content of the at least one image based on the trained model; format the inference data according to a data streaming protocol used for data transmission in the data analytics pipeline; and transmit the formatted inference data to a second server in the data analytics pipeline using the data streaming protocol. The series of images includes a video frame, and wherein the inference data includes a textual representation of the data analytics performed on the captured stream data. The trained model includes instructions for determining a textual description of the series of images, wherein a data size of the textual description is less than a data size of the series of images. The data streaming protocol includes one or more portions of the series of images, wherein a data size of the one or more portions of the series of images is less than a data size of the series of images. The computer-executable instructions when executed further cause the system to: receive, by an IoT device, the trained model from an on-premises server; and transmit the formatted inference data to the on-premises server. The IoT device is a video imaging device, wherein the server is an on-premises edge server in a hierarchy of servers of the data analytics pipeline. The data analytics pipeline includes a network bottleneck between the IoT device and the on-premises edge server over a wireless network. The computer-executable instructions when executed further cause the system to: receive other inference data at the server; aggregate the inference data and the other inference data; and format the aggregated inference data for transmission to a second server, wherein the second server is one of a network server or a cloud server, wherein the data analytics pipeline includes a network bottleneck between the on-premises edge server and one of the network edge server or the cloud server.

In still further aspects, the technology relates to a computer-readable recording medium storing computer-executable instructions for reducing stream data for performing data analytics in a data analytics pipeline, the data analytics pipeline including processing of the stream data from a plurality of sensing devices to servers of a cloud network environment based on multi-access edge computing. The computer-executable instructions when executed by a processor cause a computer system to: retrieve, by a sensing device, the trained model, wherein the trained model includes instructions for processing content of a series of images to generate inference data for data analytics in the data analytics pipeline; capture stream data, wherein the captured stream data includes the series of images; generate, based on at least one image of the captured stream data, inference data using the trained model, wherein the inference data includes a description as inferred from the content of the at least one image based on the trained model; format the inference data according to a data streaming protocol used for data transmission in the data analytics pipeline; and transmit the formatted inference data rather than the captured stream data to a server in the data analytics pipeline using the data streaming protocol. The series of images includes a video frame, and wherein the inference data includes a textual representation of the data analytics performed on the captured stream data. The trained model includes instructions for determining one of regions of interest or a textual description of the series of images, wherein a data size of the textual description is less than a data size of the series of images. The data streaming protocol includes one or more portions of the series of images, wherein a data size of the one or more portions of the series of images is less than a data size of the series of images.

Any of the one or more above aspects in combination with any other of the one or more aspect. Any of the one or more aspects as described herein.

What is claimed is:

1. A computer-implemented method for reducing stream data for performing data analytics in a data analytics pipeline, the data analytics pipeline including processing of the stream data from a plurality of sensing devices to servers of a cloud network environment based on multi-access edge computing, the method comprising:
    retrieving, by a sensing device, a trained model, wherein the trained model includes instructions for processing content of a series of images to generate inference data as reduced stream data for performing data analytics in the data analytics pipeline;
    capturing stream data, wherein the captured stream data includes the series of images;
    generating, based on content of at least one image of the captured stream data, non-photorealistic inference data of the content as the reduced stream data of the captured stream data using the trained model, wherein the reduced stream data includes a description as inferred from the content of the at least one image based on the trained model;
    formatting the reduced stream data according to a data streaming protocol used for data transmission in the data analytics pipeline, wherein the data streaming protocol includes a transmission of non-photorealistic inference data of photorealistic image data; and
    transmitting the formatted reduced stream data rather than the captured stream data to a server in the data analytics pipeline using the data streaming protocol, wherein the formatted reduced stream data includes the non-photorealistic inference data of the content of the at least one image of the captured stream data.

2. The computer-implemented method of claim 1, wherein the series of images includes a video frame, and wherein the inference data includes a textual representation of the data analytics performed on the captured stream data.

3. The computer-implemented method of claim 1, wherein the trained model includes instructions for determining a textual description of the series of images, wherein a data size of the textual description is less than a data size of the series of images.

4. The computer-implemented method of claim 1, wherein the trained model includes instructions for identifying one or more portions of the series of images, wherein a data size of the one or more portions of the series of images is less than a data size of the series of images.

5. The computer-implemented method of claim 1, the method further comprising:
    receiving, by the sensing device, the trained model from an on-premises server, wherein the sensing device is an IoT device; and
    transmitting the formatted reduced stream data to the on-premises server.

6. The computer-implemented method of claim 1, wherein the sensing device is a video imaging device, wherein the server is an on-premises edge server in a hierarchy of servers of the data analytics pipeline.

7. The computer-implemented method of claim 6, wherein the data analytics pipeline includes a network bottleneck between the sensing device and the on-premises edge server over a wireless network.

8. The computer-implemented method of claim 6, the method further comprising:
causing the server to receive other reduced stream data from a second IoT device;
aggregating the reduced stream data and the other reduced stream data; and
formatting the aggregated reduced stream data for transmission to a second server, wherein the second server is one of a network edge server or a cloud server, and wherein the data analytics pipeline includes a network bottleneck between the on-premises edge server and one of the network edge server or the cloud server.

9. A system for reducing stream data for performing data analytics in a data analytics pipeline, the data analytics pipeline including processing of the stream data from a plurality of sensing devices to servers of a cloud network environment based on multi-access edge computing, the system comprising:
a processor; and
a memory storing computer-executable instructions that when executed by the processor cause the system to:
retrieve, by a first server, a trained model, wherein the trained model includes instructions for processing content of a series of images to generate inference data as reduced stream data for performing data analytics in the data analytics pipeline;
receive captured stream data from a sensing device, wherein the captured stream data includes the series of images;
generate, based on content of at least one image of the captured stream data, non-photorealistic inference data of the content as the reduced stream data of the captured stream data using the trained model, wherein the reduced stream data includes a description as inferred from the content of the at least one image based on the trained model;
format the reduced stream data according to a data streaming protocol used for data transmission in the data analytics pipeline, wherein the data streaming protocol includes a transmission of non-photorealistic inference data of photorealistic image data; and
transmit the formatted reduced stream data to a second server in the data analytics pipeline using the data streaming protocol, wherein the formatted reduced stream data includes the non-photorealistic inference data of the content of the at least one image of the captured stream data.

10. The system of claim 9, wherein the series of images includes a video frame, and wherein the inference data includes a textual representation of the data analytics performed on the captured stream data.

11. The system of claim 9, wherein the trained model includes instructions for determining a textual description of the series of images, wherein a data size of the textual description is less than a data size of the series of images.

12. The system of claim 9, wherein the data streaming protocol includes one or more portions of the series of images, wherein a data size of the one or more portions of the series of images is less than a data size of the series of images.

13. The system of claim 9, the computer-executable instructions when executed further cause the system to:
receive, by the sensing device, the trained model from an on-premises server; and
transmit the formatted reduced stream data to the on-premises server.

14. The system of claim 9, wherein the sensing device is a video imaging device, wherein the first server is an on-premises edge server in a hierarchy of servers of the data analytics pipeline.

15. The system of claim 14, wherein the data analytics pipeline includes a network bottleneck between the sensing device and the on-premises edge server over a wireless network.

16. The system of claim 14, the computer-executable instructions when executed further cause the system to:
receive other reduced stream data at the first server;
aggregate the reduced stream data and the other reduced stream data; and
format the aggregated reduced stream data for transmission to the second server, wherein the second server is one of a network edge server or a cloud server, wherein the data analytics pipeline includes a network bottleneck between the on-premises edge server and one of the network edge server or the cloud server.

17. A computer-readable non-transitory recording medium storing computer-executable instructions for reducing stream data for performing data analytics in a data analytics pipeline, the data analytics pipeline including processing of the stream data from a plurality of sensing devices to servers of a cloud network environment based on multi-access edge computing, the computer-executable instructions that when executed by a processor cause a computer system to:
retrieve, by a sensing device, a trained model, wherein the trained model includes instructions for processing content of a series of images to generate inference data as reduced stream data for performing data analytics in the data analytics pipeline;
capture stream data, wherein the captured stream data includes the series of images;
generate, based on content of at least one image of the captured stream data, non-photorealistic inference data of the content as the reduced stream data of the captured stream data using the trained model, wherein the reduced stream data includes a description as inferred from the content of the at least one image based on the trained model;
format the reduced stream data according to a data streaming protocol used for data transmission in the data analytics pipeline, wherein the data streaming protocol includes a transmission of non-photorealistic inference data of photorealistic image data; and
transmit the formatted reduced stream data rather than the captured stream data to a server in the data analytics pipeline using the data streaming protocol, wherein the formatted reduced stream data includes the non-photorealistic inference data of the content of the at least one image of the captured stream data.

18. The computer-readable non-transitory recording medium of claim 17, wherein the series of images includes a video frame, and wherein the inference data includes a textual representation of the data analytics performed on the captured stream data.

19. The computer-readable non-transitory recording medium of claim 17, wherein the trained model includes instructions for determining one of regions of interest or a textual description of the series of images, wherein a data size of the textual description is less than a data size of the series of images.

20. The computer-readable non-transitory recording medium of claim 17, wherein the data streaming protocol includes one or more portions of the series of images, wherein a data size of the one or more portions of the series of images is less than a data size of the series of images.

\* \* \* \* \*